United States Patent
Queveau et al.

(10) Patent No.: US 7,325,857 B2
(45) Date of Patent: Feb. 5, 2008

(54) RETRACTABLE VEHICLE-ROOF

(75) Inventors: Gérard Queveau, Le Pin (FR); Paul Queveau, Montravers (FR); Jean-Marc Guillez, Cirieres (FR)

(73) Assignee: Seba—Societe Europeenne de Brevets Automobiles, Paris (FR)

( * ) Notice: Subject to any disclaimer, the term of this patent is extended or adjusted under 35 U.S.C. 154(b) by 0 days.

(21) Appl. No.: 10/552,090

(22) PCT Filed: Apr. 20, 2004

(86) PCT No.: PCT/FR2004/000975

§ 371 (c)(1),
(2), (4) Date: Oct. 4, 2005

(87) PCT Pub. No.: WO2004/096592

PCT Pub. Date: Nov. 11, 2004

(65) Prior Publication Data

US 2006/0273618 A1    Dec. 7, 2006

(30) Foreign Application Priority Data

Apr. 29, 2003   (FR)  .................................. 03 05249

(51) Int. Cl.
*B60J 7/14*  (2006.01)
(52) U.S. Cl. ................... 296/108; 296/107.07
(58) Field of Classification Search .......... 296/107.08, 296/108, 107.16–107.17, 219, 116, 107.07
See application file for complete search history.

(56) References Cited

U.S. PATENT DOCUMENTS

| 2,694,598 A | * | 11/1954 | Ulrich ........................ 296/219 |
| 5,078,447 A | * | 1/1992 | Klein et al. .............. 296/107.2 |
| 5,975,620 A | * | 11/1999 | Jambor et al. .............. 296/108 |

FOREIGN PATENT DOCUMENTS

DE    1013183   *  8/1957  ............ 296/107.17

* cited by examiner

*Primary Examiner*—Dennis H. Pedder
(74) *Attorney, Agent, or Firm*—Nawrocki, Rooney & Sivertson, P.A.

(57) ABSTRACT

The invention relates to a retractable car roof, comprising several rigid roof elements that can be moved between a position in which they cover the passenger compartment of the vehicle and a position in which they are stored in the vehicle's rear luggage compartment.

This roof comprises the following:
at least one rear central roof element (5) and one front central roof element (6);
rear (7) and front (8) lateral roof elements;
the rear central roof element articulated to the chassis of the vehicle around a first transverse axle (9) and the front central roof element articulated to the rear central roof element around a second transverse axle (10);
the rear lateral elements articulated to the chassis and the front lateral elements articulated to the rear lateral roof elements.

3 Claims, 3 Drawing Sheets

RETRACTABLE VEHICLE-ROOF

BACKGROUND OF THE INVENTION

The present invention relates to a retractable vehicle roof, and more particularly, such a roof comprising several rigid roof elements that can be moved between a position in which they cover the passenger compartment of the vehicle and a position in which they are stored in the rear luggage compartment of the vehicle.

Such retractable roofs are known that make it possible to transform a saloon or coupe vehicle into a cabriolet vehicle.

One of the problems to be solved when designing such roofs is not to excessively reduce the volume of the rear luggage compartment when the roof elements are stored.

SUMMARY OF THE INVENTION

For this purpose, the object of the invention is a retractable vehicle roof, comprising several rigid roof elements that can be moved between a position in which they cover the passenger compartment of the vehicle and a position in which they are stored in the rear luggage compartment of the vehicle, the roof comprising:

at least one rear central roof element and one front central roof element;

a left rear lateral roof element, a left front lateral roof element, a right rear lateral roof element, and a right front lateral roof element;

the rear central roof element articulated to the chassis of the vehicle around a first transverse axle, the rear edge of the front central roof element articulated under the front edge of rear central roof element around a second transverse axle;

the left and right rear lateral roof elements articulated to the chassis of the vehicle around third and fourth transverse axles respectively, and the rear edge of the left and right front lateral roof elements articulated to the front edge of the left and right rear lateral roof elements, around fifth and sixth transverse axles respectively.

The central roof elements are therefore separate from the lateral roof elements, and the lateral roof elements are positioned such that they are stored at the sides of the rear luggage compartment.

In this description, "transverse" axle means an axle that is substantially perpendicular to the vehicle's plan of symmetry.

In a specific embodiment of the invention, the retractable roof according to the invention comprises means for moving the left and right rear central roof elements outwards during their rotation around the said third and fourth transverse axles respectively.

This makes it possible for the lateral elements to pass on either side of the rear seats when stored in the rear luggage compartment.

More specifically, the said means may comprise a threaded part formed integral with the said left and right rear lateral roof elements respectively to work with a complementary thread on the third and fourth transverse axles respectively.

It should be noted that the aforementioned complementary threads can be reduced to a simple helical groove into which a guide finger is inserted.

BRIEF DESCRIPTION OF THE DRAWINGS

A specific embodiment of the invention is described below, as a non-exhaustive example, made in reference to the appended diagrams, in which.

DETAILED DESCRIPTION OF THE INVENTION

Figure 1:
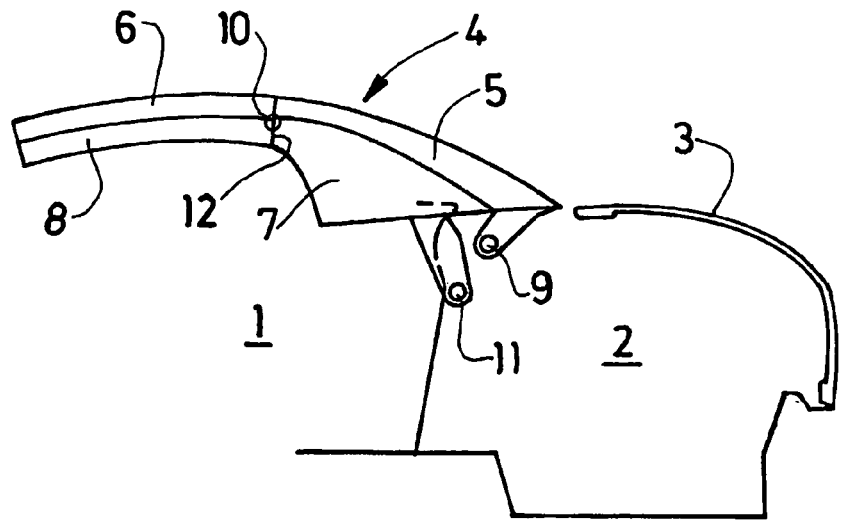
FIG. 1 is a side view of a part of a vehicle provided with a roof according to the invention, with the roof in the closed position.

FIG. 1 shows the rear of a motor vehicle with its passenger compartment 1 and its rear luggage compartment 2. The rear luggage compartment 2 is closed by a lid 3 that can be opened from front to back (FIGS. 2, 3 and 4) for storing the roof 4 in the luggage compartment of the vehicle, or in the standard way, from back to front, for storing luggage in the compartment.

The roof 4 is made up of a rear central element 5, a front central element 6, two rear lateral elements 7 and two front lateral elements 8.

The rear central element 5 is articulated to the chassis at the rear around a transverse axle 9. The rear edge of the front central element 6 is articulated to the front edge of the rear central element 5 around a transverse axle 10.

Each of the rear lateral elements 7 is articulated to the chassis around a fixed transverse axle 11. The rear edge of each of the front lateral elements 8 is articulated to the front edge of the respective rear lateral element 7 around a transverse axle 12.

In FIG. 1, the roof elements 5-8 are unfolded above the passenger compartment 1 which they cover. The vehicle is therefore in its saloon or coupe configuration.

Figure 2:
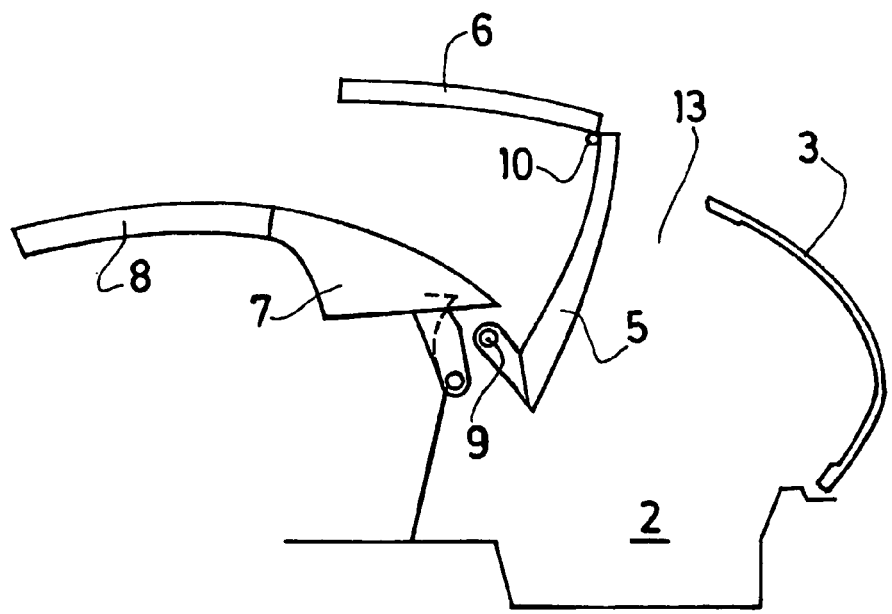
FIGS. 2, 3 and 4 show this roof folding into the rear luggage compartment of the vehicle.

In FIG. 2, the lid 3 of the luggage compartment 2 is opened backwards, in order to make way 13 for the roof elements. Known means, not shown, are used to provide the swinging of the rear central element 5 around the axle 9 and the swinging of the front central element 6 around the axle 10. During this movement, the lateral elements 7 and 8 remain fixed.

Figure 3:
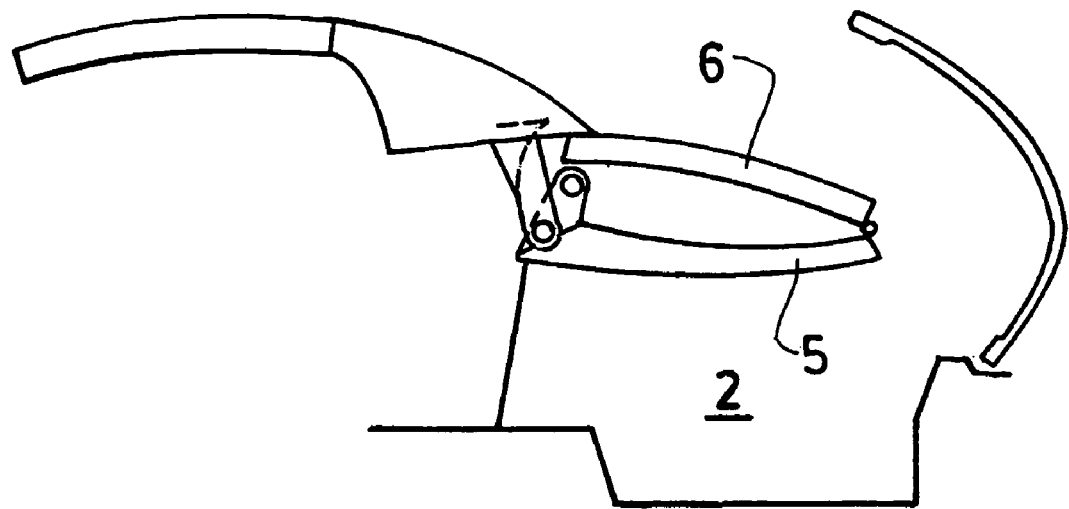
Figure 4:
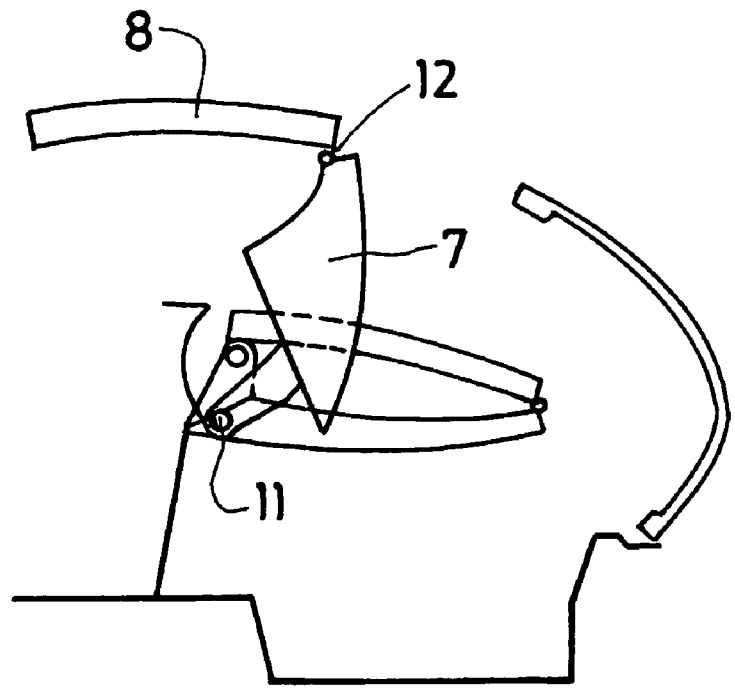
Figure 5:
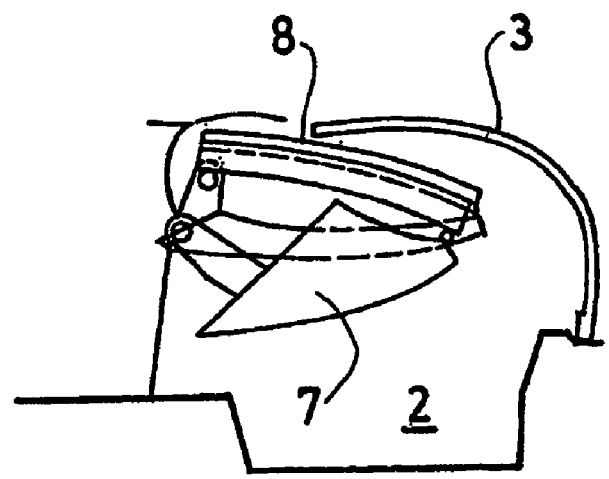
FIG. 5 shows the roof stored in the rear luggage compartment of the vehicle.

The movement of the central elements 5 and 6 continues until the configuration in FIG. 3, where the elements are stored substantially horizontally on top of each other in the rear luggage compartment 2.

Known means, not shown, provide the rotation of the rear lateral elements 7 around the axles 11 and the front lateral elements 8 around the axles 12.

Figure 6:
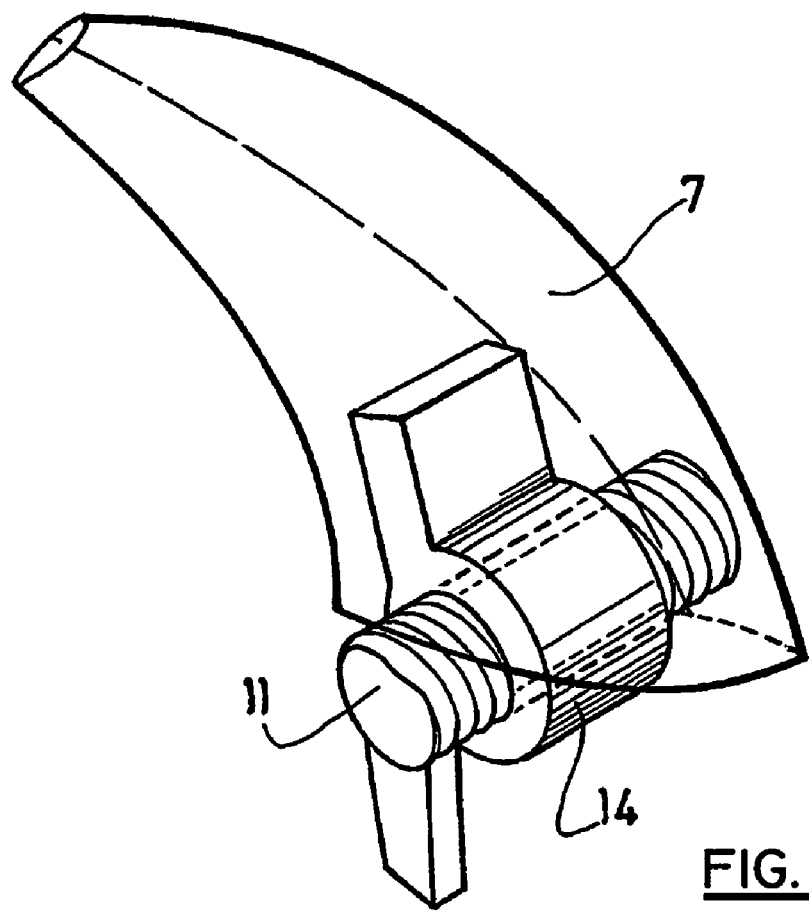
FIG. 6 shows a specific mechanism of the invention.

In FIG. 6 it can be seen that each of the rear lateral elements 7 is formed integral with a part 14 engaged on the shaft 11 formed integral with the chassis of the vehicle. The part 14 is threaded on the inside, whereas the axle 11 is threaded on the outside. Thus, when the roof elements 7 rotate around the axle 11, they are driven towards the outside in order to be shifted in relation to their original position. This movement therefore makes it possible for the lateral elements 7 and 8 to be arranged on either side of the rear seats of the vehicle and on either side of the central elements, which are already stored in the luggage compartment.

When the rotation and translation movements are completed, the lateral elements 7 and 8 are stored substantially horizontally at the sides of the rear luggage compartment 2, the lid 3 of which can then be closed. The vehicle is then in cabriolet configuration.

The lateral elements can also be left in place on the passenger compartment of the vehicle, and thus in "open roof" configuration.

The vehicle can be returned to saloon or coupe configuration by performing the movements described above in the opposite order.

The system according to the invention makes it possible to increase, on one hand, the height of passage for luggage in the luggage compartment and, on the other hand, the storage height.

The invention claimed is:

1. A retractable car roof, comprising several rigid roof elements that can be moved between a position in which they cover the passenger compartment of the vehicle and a position in which they are stored in the rear luggage compartment of the vehicle, characterised in that it comprises the following:
    at least one rear central roof element (5) and one front central roof element (6);
    a left rear lateral roof element (7), a left front lateral roof element (8), a right rear lateral roof element, and a right front lateral roof element;
    the rear central roof element is articulated to the chassis of the vehicle around a first transverse axle (9) and the rear edge of the front central roof element is articulated to the front edge of the rear central roof element around a second transverse axle (10);
    the left and right rear lateral roof elements are articulated to the chassis of the vehicle around a third and fourth transverse axle (11) respectively and the rear edge of the left and right front lateral roof elements respectively are articulated to the front edge of the left and right rear lateral roof elements, around a fifth and sixth transverse axle (12).

2. A retractable roof according to claim 1, comprising means (11, 14) for shifting the left and right rear lateral roof elements outwards during their rotation around the third and fourth transverse axles respectively.

3. A retractable roof according to claim 2, in which the said means comprise a threaded part (14) formed integral with the said left and right rear lateral roof elements respectively, arranged in order to work with a complementary thread on the said third and fourth transverse axle (11).

* * * * *